Oct. 16, 1951  A. A. WARNER  2,571,318
FABRICATED SPLINED SHAFT
Filed July 7, 1944
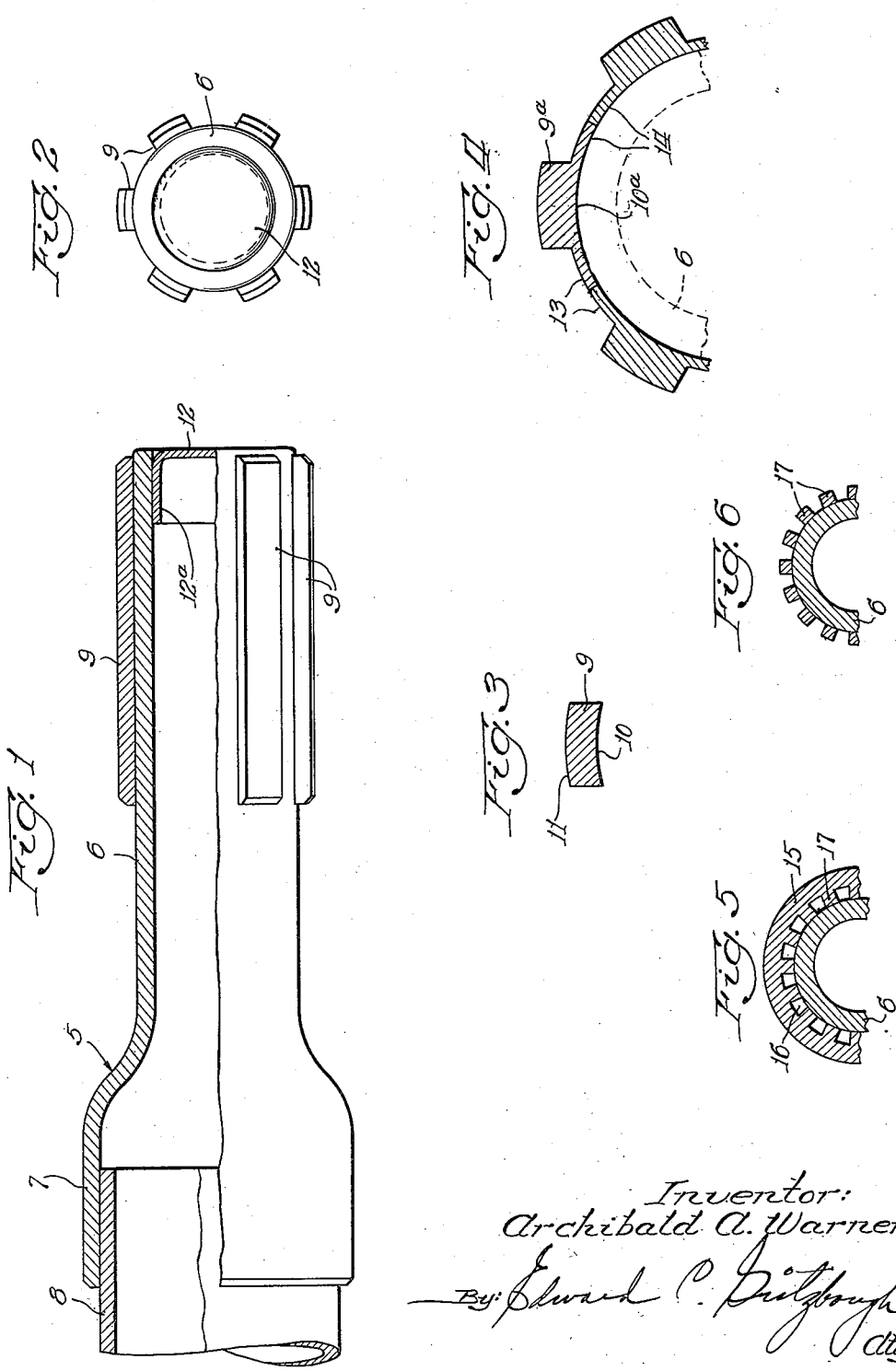
Inventor:
Archibald A. Warner
By: Edward C. ...
Atty.

Patented Oct. 16, 1951

2,571,318

UNITED STATES PATENT OFFICE 2,571,318

FABRICATED SPLINED SHAFT

Archibald A. Warner, Rockford, Ill., assignor to Borg-Warner Corporation, Chicago, Ill., a corporation of Illinois Application July 7, 1944, Serial No. 543,945

2 Claims. (Cl. 64—1)

The present invention relates to a tubed article of manufacture. The improvements that are contemplated herein are particularly directed to a splined tubular shaft for use in an assembly wherein two members are adapted for axial movement with respect to each other. For example, the article may be part of a clutch assembly, or it may be employed for cooperation with a universal joint in connection with a propeller or transmission shaft in a mechanical power drive.

It is one of the principal objects of this invention to simplify the construction of a splined shaft or similar article of manufacture and to provide a novel assembly wherein readily available stock items and preformed members are used in the fabrication of the article instead of expensive upset forgings. In this connection the components are put together and the article is completely assembled in a minimum of time, thus effecting a substantial reduction in the cost of manufacture.

Another principal object of this invention is to provide a splined article of manufacture wherein the parts are readily assembled by brazing or the like bonding of a plurality of separate strips to a suitable body member or shaft to effect a unitary assembly. This assembly is accomplished without requiring the usual slow hobbing operations that are presently resorted to in the forming of splines on a shaft.

A further object hereof resides in providing splines for a shaft that comprise sections cut out longitudinally from a tube having a cylindrical wall of the same thickness as the required height of the splines, the inner circumference of such tube having the same curvature as the outer surface of the shaft to which the splines are united or bonded. Alternately, the splines may comprise internal ribs formed preferably by broaching a plurality of channels in a metal cylinder and then bonding the inner edges of these ribs to the outer surface of a shaft, after which the thickness of the cylinder wall is reduced by cutting away the outer portion of the metal in a lathe until only the ribs remain. Conceivably, the splines may also comprise metal strips that are given a concavo-convex or arcuate cross section by subjecting them to stamping operations to shape them to the required curvatures.

Still another object hereof resides in providing a tubed article of manufacture, such for example, as a terminal or stub end of a shaft, that has a longitudinal portion thereof reduced in diameter by swaging, thereby increasing the thickness of the wall that is to receive the splines. As a result of the swaging operation on a portion of the tube, there remains an outwardly flared cup-shaped terminal at the unswaged end of the article that affords an instrumentality for readily assembling the article upon the adjacent end of a propeller or power transmission shaft.

Additional objects, aims, and advantages of the invention contemplated herein will be apparent to persons skilled in the art after the construction and operation of the tubular assembly is understood from the within description.

It is preferred to accomplish the numerous objects of this invention and to practice the same in substantially the manner hereinafter fully described and as more particularly pointed out in the appended claims, reference being made to the accompanying drawings that form a part of this specification, wherein:

Fig. 1 is a longitudinal view, partly in section, of an article of manufacture embodying the instrumentalities of the present invention;

Fig. 2 is a view looking at the right hand end of the article shown in Fig. 1;

Fig. 3 is a view in enlarged transverse section of one of the strips for providing splines upon the article;

Fig. 4 is a view, similar to Fig. 3, showing a strip of modified form;

Fig. 5 is a transverse section of an alternative form of the present invention prior to the final step of fabrication; and Fig. 6 is a view similar to Fig. 5, showing the completed article.

The drawings are to be understood as being more or less of a schematic character for the purpose of disclosing typical or preferred forms of the improvements contemplated herein, and in these drawings like reference characters identify the same parts in the several views.

In the assembled article of manufacture shown in Fig. 1, the body member, designated as 5, comprises a stock tube of suitable length and diameter that is initially of the diameter of the portion at the left hand end. This tube is subjected to swaging operations in a forge to reduce its diameter as at the right hand portion wherein the cylindrical wall is increased in thickness by the swaging operation. Thus the tube embodies two portions, viz: the small diameter portion 6 having a thick wall and the remaining portion 7 that provides a cup-shaped terminal that has a large diameter and a relatively thin wall. This cup-shaped terminal portion 7 of the tube is telescoped preferably upon the outside of the proximate end of a power transmission member 8 to which it is bonded by brazing or in any other suitable manner.

The reduced or major portion 6 of the tube is provided with splines for use in any type of assembly wherein two of the members thereof are adapted for axial movement the one with respect to the other, such as the propeller shaft of a power transmission mechanism, a clutch that connects an internal combustion engine to a driven shaft, a universal joint between two angularly disposed shafts, and similar assemblies.

The splines comprise a plurality of strips 9 that are laterally spaced from each other circumferentially of the portion 6 of the tubular body 5. These strips each have a thickness that corresponds to the required height of the splines and they extend longitudinally of the body 5 a distance equal to the splined portion of the article. As shown in Figs. 2 and 3, the spline strips 9 are preformed by giving them a shape that is of concavo-convex cross section, the concave faces 10 thereof corresponding with the arcuate or cylindrical surface of the tube body portion 6 that has been reduced in diameter, and the arcs of the other or convex faces 11 of the spline strips 9 preferably being concentric with the concave surfaces 10.

These spline strips 9 may be cut from sheet metal and stamped to give them the required concavo-convex cross section. Another manner of forming these strips is to cut them from a cylindrical tube having proper wall thickness and an internal diameter that corresponds to the outside diameter of the reduced body portion 6 of the article. In each instance the strips are of a pre-formed character before they are attached to the body portion 6. After the strips 9 have been placed upon the circumference of the body of the article they are bonded thereto by brazing or otherwise to unite them integrally to said body.

Under certain conditions it is desirable to close the end of the reduced portion 6 of the tubular body to exclude extraneous matter from the interior of the tube. This is effectively accomplished by inserting a flanged disk 12 into the open end of the tube 5 as shown in Fig. 1. The annular flange or rim 12a of this disk is forced into the tube and then bonded thereto by brazing the contacting surfaces together.

In the modified form shown in Fig. 4, the splines are pre-formed members that comprise strips 9a of concavo-convex cross section that are provided with laterally extending flanges or wings 13 along their longitudinal edges, the under surfaces 14 of these flanges forming continuations of the concave surfaces 10a of these strips 9a. These flanges 13 perform the function of spacers when the strips are placed on the tube 6 with the edges of the flanges abutting each other prior to the brazing or bonding operation.

In Figs. 5 and 6 the splines are pre-formed upon the interior of a metal tube 15 of proper inside diameter to telescope upon the tubular body or shaft 6. The tube 15 has parallel longitudinal channels 16 cut in it by a broaching operation to provide spaced ribs 17. The tube 15 is then telescoped upon the body 6 and the inner faces of the ribs 17 that contact the outer surface of the body are bonded thereto in any suitable manner. The assembled structure is turned in a lathe to reduce the thickness of the metal tube 15 until all that remains of this member are the longitudinally disposed strips comprising the ribs or splines 17 bonded or anchored to the exterior of the body 6. Since the ribs or splines 17 are formed from a tube, they have concave faces engaged with the tubular body 6, and the outer surfaces of said ribs are turned convex during the cutting away operation in the lathe.

While this invention has been described in detail in its present preferred forms or embodiments, it will be apparent to persons skilled in the art, after understanding the improvements, that various changes and modifications may be made therein without departing from the spirit or scope thereof. It is aimed therefore in the appended claims to cover all such changes and modifications.

I claim:

1. A splined power-transmitting shaft comprising an elongated metallic tube of cylindrical cross section; a plurality of metallic strips extending longitudinally of said tube; flanges extending laterally from the longitudinal edges of said strips; the inner surfaces of said strips and flanges conforming with the exterior surface of said tube; and bonding means, in the form of metallic solder between said exterior surface of said tube and the strips including the flanges integral therewith, integrally uniting said strips and their flanges to said tube; the flanges being disposed in abutting relation to each other to laterally space said strips circumferentially of said tube, whereby splines are provided throughout the lengths of said strips.

2. A power-transmitting element comprising a metallic body; metallic strips parallel to each other on a surface of said body; flanges on said strips and each extending laterally along at least one of the longitudinal edges of each strip and in abutting relation to the adjacent strip to laterally space said strips along said surface; and bonding means between said strips and body and integrally uniting said strips to said body, said bonding means comprising a metal solder between said body and the strips and flanges thereof and joining said body to said strips including the flanges thereof.

ARCHIBALD A. WARNER.

REFERENCES CITED

The following references are of record in the file of this patent:

UNITED STATES PATENTS

| Number | Name | Date |
| --- | --- | --- |
| 598,436 | Perkins | Feb. 1, 1898 |
| 1,065,969 | Rogers | July 1, 1913 |
| 1,233,688 | Murray et al. | July 17, 1917 |
| 1,827,129 | Williams | Oct. 13, 1931 |
| 2,067,282 | Padgett | Jan. 12, 1937 |